No. 843,604. PATENTED FEB. 12, 1907.
T. B. HENDRICKS.
BRUSH CUTTING MACHINE.
APPLICATION FILED APR. 23, 1906.
2 SHEETS—SHEET 1.
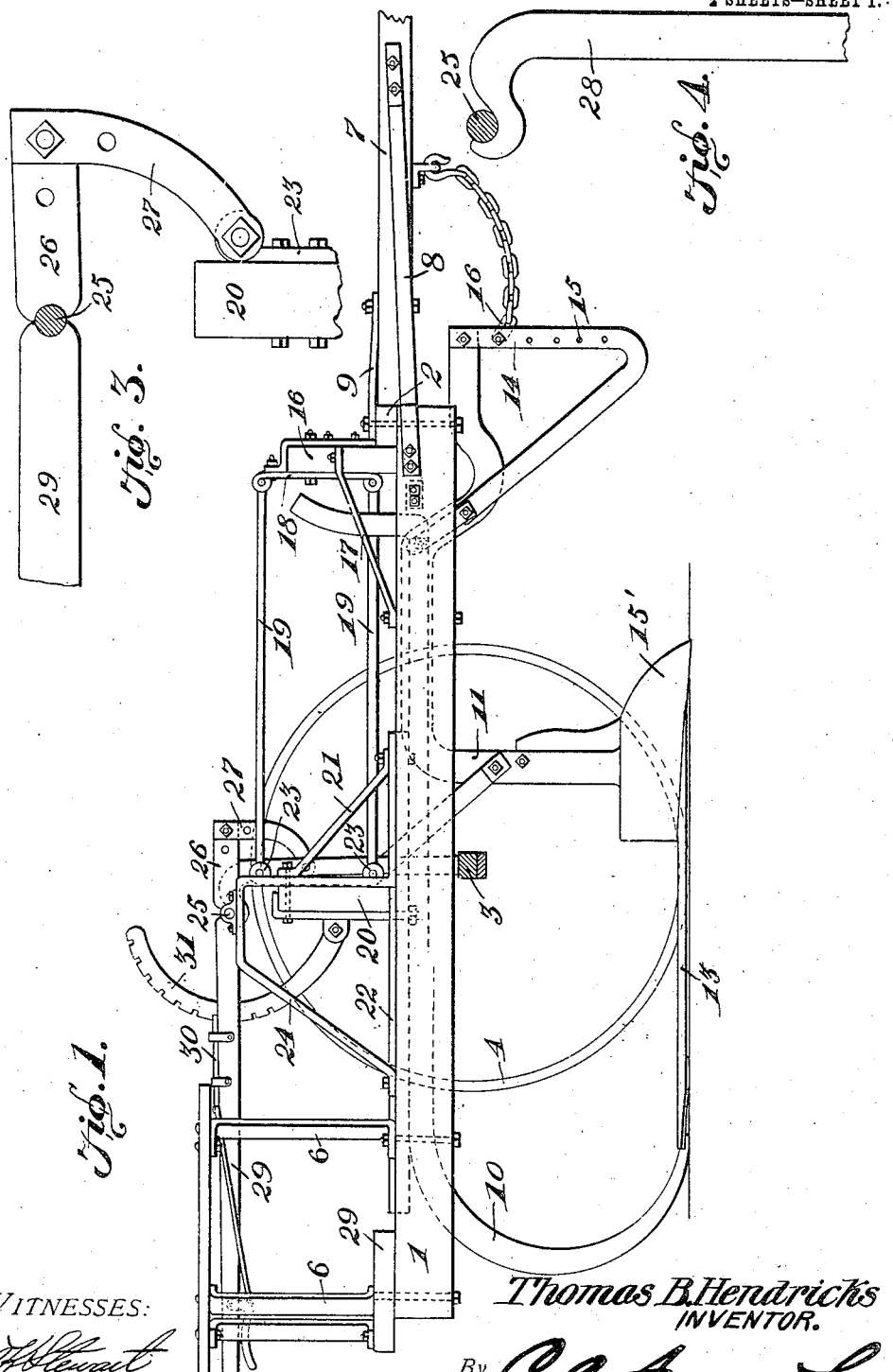
WITNESSES:
Thomas B. Hendricks
INVENTOR.
By C. A. Snow & Co.
ATTORNEYS

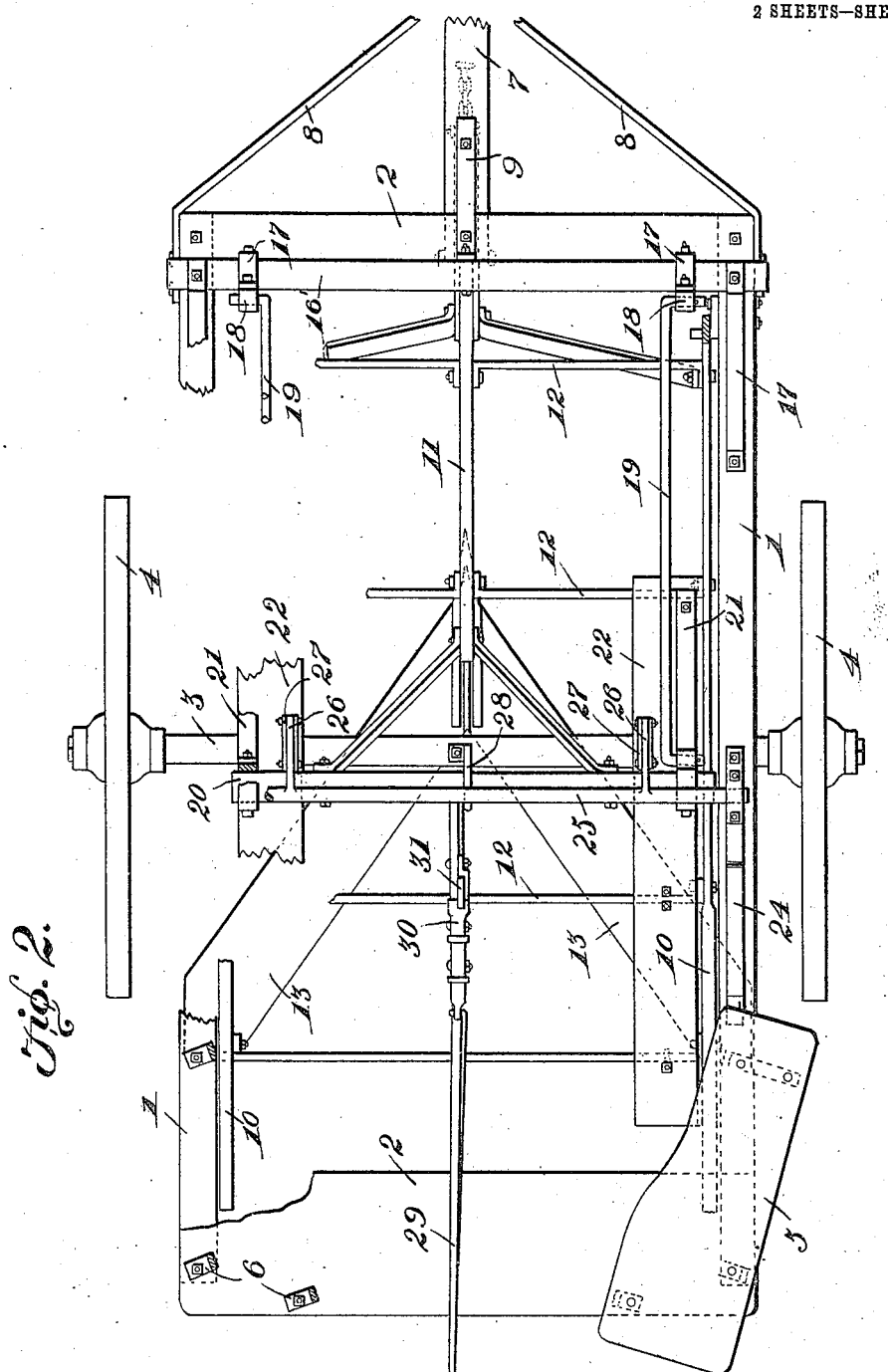

UNITED STATES PATENT OFFICE.

THOMAS B. HENDRICKS, OF TWIN FALLS, IDAHO.

BRUSH-CUTTING MACHINE.

No. 843,604.  Specification of Letters Patent.  Patented Feb. 12, 1907.

Application filed April 23, 1906. Serial No. 313,354.

*To all whom it may concern:*

Be it known that I, THOMAS B. HENDRICKS, a citizen of the United States, residing at Twin Falls, in the county of Cassia and State of Idaho, have invented a new and useful Brush-Cutting Machine, of which the following is a specification.

The present invention relates to brush-cutting machines of sulky type; and it has for one of its objects to improve the construction of machines of this character so that the cutting-blades can be easily adjusted to obtain the proper depth of cut or penetration of the blades into the ground for rooting out the brush, weeds, or other plants to be eradicated.

A further object is to so mount the blade-carrying frame that the strains thereon incident to use can be successfully withstood during any operative position assumed by the frame and that the position of the blades may be maintained horizontal, or substantially so, throughout the range of adjustmen of the blade-carrying frame.

With these and other objects in view the invention consists of certain details of construction and arrangement of parts, to be more fully described hereinafter, and specifically set forth in the claims appended hereto.

In the accompanying drawings, which illustrate the invention in one of its embodiments, Figure 1 is a side elevation of the brush-cutting machine. Fig. 2 is a plan view thereof with portions broken away for clearness of illustration, and Figs. 3 and 4 are details view of portions of the means for supporting and adjusting the blade-carrying frame.

Referring to the drawings, 1 represents the side beams, and 2 the end or cross beams, of the frame of the machine, which frame is supported upon the axle 3, which at its ends carry the wheels 4. The rear cross-beam is of sufficient width to serve as a platform for the operator, and adjacent each end thereof are seats 5, mounted on the frame by iron uprights 6. At the front of the frame is arranged a tongue or draft-pole 7, braced upon the frame by diagonal braces 8 and a center brace 9.

The blade-carrying frame is arranged within the frame of the machine and comprises two side bars 10, arranged adjacent the side beams of the frame, a center bar 11, and transverse braces 12, bolted to the bars. The side bars extend from the front of the machine to the rear end thereof, where they are turned downwardly and forwardly to support at their extremities the rear ends of the blades 13. The center member or bar 11 is of considerably shorter length than the side bars and is arranged at the front portion of the machine and has its rear end depending so as to support at its bottom the front ends of the cutters. The front portion of the center bar is bent downwardly to extend under the front of the main frame, and secured thereto is a member 14, provided with a series of openings 15 for receiving a clevis 16, by which the frame is chained to the tongue of the machine. The front ends of the blades 13 are disposed adjacent the center of the machine and diverge rearwardly. At the apex of the blades is a vertical cutter 15', which inclines downwardly below the level of the blades and serves to guide the movement of the latter.

The blade-carrying frame is supported by a system of parallel links which are arranged to permit adjustment of the frame in such a manner as to maintain the blades always in a horizontal position, so as to facilitate the cutting operation. On the front end of the main frame is a second cross-beam 16' braced by means of braces 17. On the rear side of this beam are metal strips 18, whose ends are formed into eyes which receive the ends of the links 19 of the system of parallel links. Supported on the side bars of the blade-carrying frame about mid-position thereof is a transverse beam 20, held in place to brackets 21. The lower ends of the brackets are bolted to foot-boards 22, secured to the transverse bars 12. The center beam 20 is also provided with metal strips 23, that have their ends formed into eyes to receive the opposite ends of the links 19. In order to support the weight of the blade-carrying frame, brackets 24 are secured on the side beams of the main frame, and journaled on the brackets is a shaft 25, to which the frame is attached by means of forwardly-extending crank-arms 26 and vertically-extending links 27, (shown more clearly in Fig. 3,) which links are hinged to the center beam 20. In order to obtain the proper adjustment, the crank-arms and links are provided with a series of openings for receiving the connecting-bolts. The center of the operating-shaft 25 is supported in an upright 28, mounted at its lower end on the axle 3 of the machine and suitably shaped at its upper end to form a journal for the shaft. Extending rearwardly from and rigidly attached to the operating-shaft, so as to be accessible from the seats, is an elevating-lever 29, provided with a latch mechanism 30 for engaging a toothed segment 31, mounted on the arm 20 of the blade-carrying frame. Thus by raising or lowering the lever 29 the blade-carrying frame can be lifted, through the crank-arm and link connections, to any position desired.

By the arrangement shown the blade-carrying frame is suspended substantially in the line of gravity, and as the system of links permit of its being lifted in a vertical direction the operation of lifting or lowering the frame can be done with very little exertion. Furthermore, the links are disposed in the direction of pull exerted on the blade-carrying frame, and hence disposed to best withstand the strains.

What I claim as new, and desire to secure by Letters Patent of the United States, is—

1. A main frame comprising side and end cross members, an axle disposed intermediate the ends of the main frame to support the same, in combination with a blade-carrying frame arranged under the main frame with its front end suspended free of the latter and extending to the front and rear sides of the axle, means for supporting the blade-carrying frame on the main frame, and a mechanism for raising the blade-carrying frame and preserving the horizontal disposition of the blades thereof.

2. In a brush-cutting machine, comprising a main frame, an axle supporting the same, and wheels on the axle, in combination with a blade-carrying frame, a system of horizontally-disposed links for guiding the movement of the blade-carrying frame with respect to the main frame, a transverse shaft on the main frame, means for actuating the shaft, and connections between the shaft and blade-carrying frame for moving the latter.

3. A brush-cutting machine, comprising a main frame, an axle supporting the same, and wheels on the axle, in combination with a blade-carrying frame, a system of links between the two frames for guiding the movement of the blade-carrying frame, means for supporting the blade-carrying frame in substantially the line of gravity, a transverse shaft on the main frame connected with said means for raising or lowering the blade-carrying frame, and a lever for actuating the shaft.

4. In combination, with a main frame provided with brackets, of an axle supporting the same, wheels on the axle, a blade-carrying frame, parallel members arranged one on the main frame and the other on the blade-carrying frame, pairs of horizontally-disposed parallel links attached to the members for guiding the blade-carrying frame, a shaft journaled on the brackets, forwardly-extending crank-arms on the shaft, links adjustably connecting the crank-arms with the blade-carrying frame, a rearwardly-extending hand-lever on the shaft for actuating the latter, and a toothed segment and latch mechanism for the lever.

5. A main frame of rectangular form, an axle disposed approximately midway of the ends of the frame, and a cross member at the forward end of the frame, in combination with a blade-carrying frame, a cross member on the latter frame located above the axle, parallel links disposed above and longitudinally of the main frame and pivoted at their ends to the said cross members, and a mechanism connected with the last-mentioned member for raising and lowering the blade-carrying frame.

6. A main frame of rectangular form, a transversely-extending axle at about the middle thereof, in combination with a blade-carrying frame having rearwardly and outwardly extending blades whose front ends are disposed in front of the axle, means for supporting the blade-carrying frame on the main frame, parallel links connecting the blade-carrying frame to the front of the main frame and disposed parallel to the line of draft, a mechanism for raising and lowering the blade-carrying frame, and an operator's seat at the rear of the main frame from which said mechanism is operated.

7. A main frame comprising side and end members, an axle supporting the frame, a transverse beam at the front end of the main frame and above the side members, a platform at the rear end of the frame, in combination with a blade-carrying frame arranged with its front end suspended free of the main frame, links extending from the transverse beam in a rearward direction, means at approximately the middle of the blade-carrying frame for connecting the latter with the links, and a mechanism arranged to be operated from the platform for raising and lowering the blade-carrying frame.

8. A main frame comprising side and end members, an axle supporting the frame, a transverse beam at the front end of the main frame, a platform at the rear end of the frame, in combination with a blade-carrying frame comprising parallel side members and transverse members connected therewith, a transverse beam supported on the side members of the blade-carrying frame, parallel links connected at their front and rear ends respectively to the cross-beams of the main and blade carrying frames, a transverse rock-shaft on the main frame, means for connecting the blade-carrying frame to the shaft, and a mechanism for rocking the shaft for
5 raising and lowering the blade-carrying frame.

In testimony that I claim the foregoing as my own I have hereto affixed my signature in the presence of two witnesses.

THOMAS B. HENDRICKS.

Witnesses:
J. O. LOE.
L. KEPLINGER.